United States Patent [19]

Frank

[11] Patent Number: 5,622,207
[45] Date of Patent: Apr. 22, 1997

[54] WATER SUPPLY SYSTEM WITH A PIPE FREEZE UP PREVENTION IN AN AIRCRAFT

[75] Inventor: Helge Frank, Hamburg, Germany

[73] Assignee: Daimler-Benz Aerospace Airbus GmbH, Hamburg, Germany

[21] Appl. No.: 609,415

[22] Filed: Mar. 1, 1996

Related U.S. Application Data

[63] Continuation of Ser. No. 381,727, Feb. 1, 1995, abandoned.

[30] Foreign Application Priority Data

Feb. 2, 1994 [DE] Germany .................. 44 03 067.3

[51] Int. Cl.[6] ............................................ B64D 11/00
[52] U.S. Cl. ............................. 137/899.2; 137/561 A; 138/32; 244/118.5
[58] Field of Search ................ 137/59, 301, 561 R, 137/561 A, 899.2; 138/32; 244/118.5

[56] References Cited

U.S. PATENT DOCUMENTS

| | | | |
|---|---|---|---|
| 349,202 | 9/1886 | Barrett | 137/301 |
| 712,859 | 11/1902 | Sheermesser | 137/301 X |
| 2,445,414 | 7/1948 | Zabriskie et al. | 137/301 X |
| 4,867,190 | 9/1989 | Jungowski et al. | 137/561 R X |
| 5,261,440 | 11/1993 | Frank . | |
| 5,303,739 | 4/1994 | Ellgoth et al. . | |
| 5,311,904 | 5/1994 | Beppu | 137/561 R |

*Primary Examiner*—John C. Fox
*Attorney, Agent, or Firm*—W. G. Fasse; W. F. Fasse

[57] ABSTRACT

Freeze-up is prevented in a tap pipe connectable to a main liquid supply line, by a liquid circulator directly inside the tap pipe. The liquid circulator is either a Pitot tube that takes advantage of the liquid flow in the main line to establish a circulation in the tap line, or the liquid circulator is a driven pump directly in the tap line. The pump is driven by an electric motor or by a turbine rotor. The turbine rotor may be an axial flow wheel, or a paddle wheel driven by the liquid flow in the main line for driving the pump. The pump itself may be a paddle wheel. The Pitot tube, the turbine rotor, and the paddle wheel are very energy efficient by using the flow or dynamic head in the main line.

15 Claims, 5 Drawing Sheets

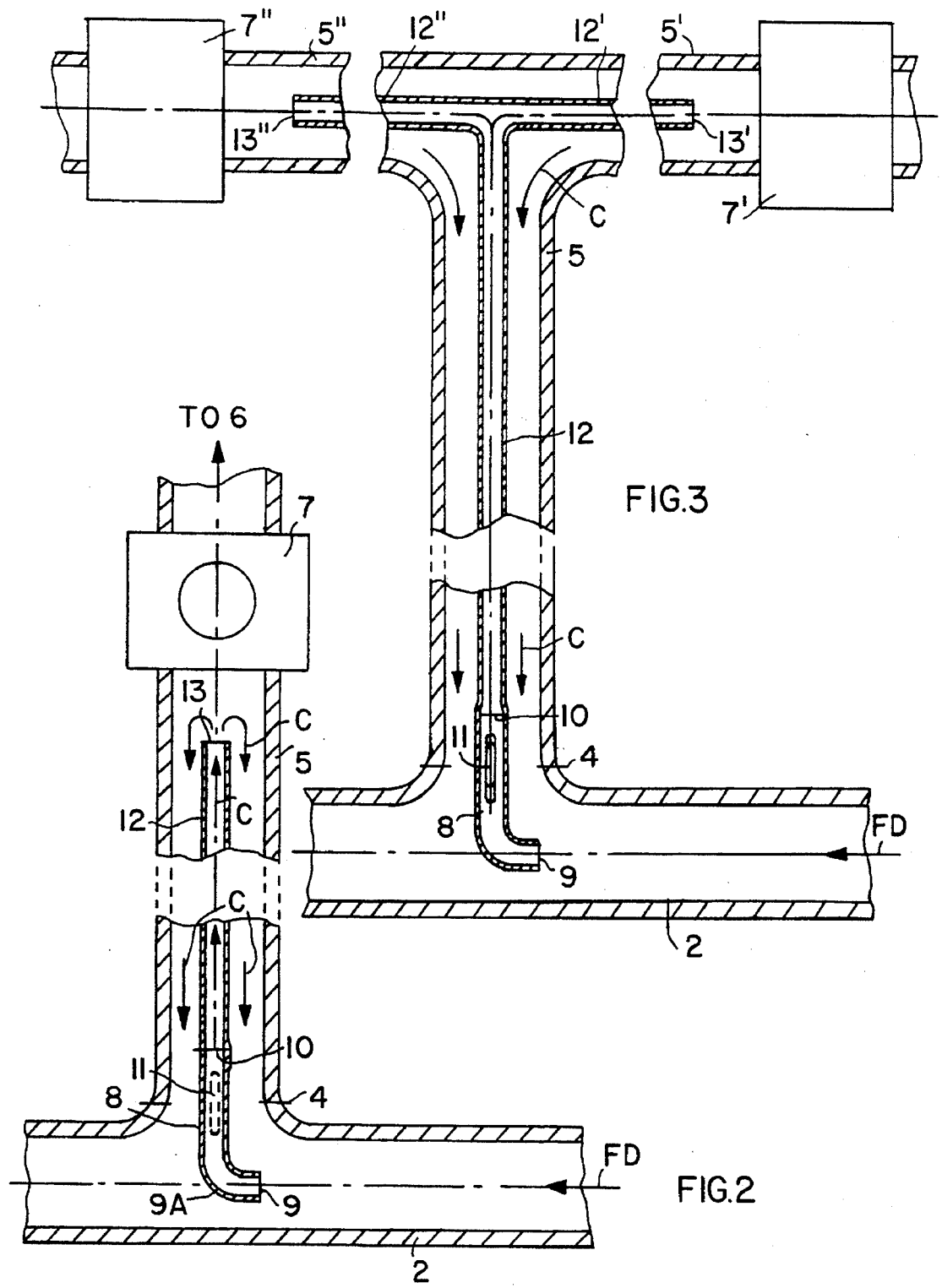

WATER SUPPLY SYSTEM WITH A PIPE FREEZE UP PREVENTION IN AN AIRCRAFT

This application is a file wrapper continuation of application Ser. No. 08/381,727, filed on Feb. 1, 1995, now abandoned.

FIELD OF THE INVENTION

The invention relates to a water supply system in an aircraft, with a feature for keeping liquid flow pipes, especially tap lines, free of freeze-ups. One end of such tap lines is normally closed by a valve, such as a faucet and the other end of the tap lines is "open" in that the open end is connected to a main liquid supply line.

BACKGROUND INFORMATION

Such water supply systems in an aircraft have a main supply tank, a plurality of tap lines or pipes connected to a main supply line which in turn is connected to the water supply tank through a pump. The discharge end of each tap line is normally closeable by a valve or faucet and a pump is connected to feed the water from the tank into the main supply line.

German patent Publication DE 4,202,719 A1 (Frank) corresponding to U.S. Pat. No. 5,261,440 (Frank) discloses a water supply system for an aircraft. The Frank system has a main water container and a water displacement container near each faucet. The water is continuously transported back and forth between the supply container and the displacement containers to prevent freeze-up. The water flow is under the control of a valve system which permits supplying compressed air to the water displacement containers or for permitting a back flow operation, whereby compressed air is removed from the water displacement containers. Such a system is capable of sustaining the main water circulation very efficiently. However, tap lines still can freeze-up unless they are separately heated or otherwise connected to a heater to prevent water freeze-up.

German Patent Publication DE 4,227,518 A1 (Ellgoth et al.) corresponding to U.S. Pat. No. 5,303,739 (Ellgoth et al.) discloses a fresh water supply system for an aircraft in which a main tank and auxiliary tanks are so interconnected and under the control of a valve system which operates in such a way that the main line is filled with water only during first time durations while being filled with air during second time durations. A venting valve is connected to the main line to permit the venting of the main line when water is removed from the main line. Air also escapes through the venting valve when the main line is being refilled with water. Tap lines are also periodically emptied by connecting the tap line to a source of reduced pressure through a respective valve. Such a system operates energy efficiently, however, it does not provide water at certain times unless the auxiliary tanks are provided near the taps. Further, auxiliary heating devices are also used in the known system.

There is room for improvement in water supply systems for aircraft with regard to tap lines that hold standing water as long as no water is being taken from the tap line. The use of heating elements is undesirable due to the additional use of energy. The use of a separate circulation in each of the tap lines is also expensive because the tap lines must be constructed as double lines to sustain the circulation. The use of an auxiliary tank for each tap line also leaves room for improvement.

OBJECTS OF THE INVENTION

In view of the above it is the aim of the invention to achieve the following objects singly or in combination:

to keep water supply lines that branch off from a main line, such as tap lines, from freezing by using less energy than was necessary heretofore;

to construct a tap line with a circulating flow with a simpler lane construction than the requirement of two parallel lines;

to minimize the number of components that would add to the weight of the water supply system in an aircraft; and to assure a continuous water supply at any tap within an aircraft without the use of auxiliary water tanks at the tap lines.

SUMMARY OF THE INVENTION

According to the invention each tap line in the water supply system is equipped with a water circulating device directly inside the tap line. The water circulating device has at least one inlet facing toward or into the main line of the supply system to which the tap line is connected and at least one outlet facing oppositely in the direction toward a faucet or the like. A hose is connected to the outlet and reaches into the tap line to such an extent that the hose passes at least through a tap line length that is exposed to freeze-up.

These features make sure that the freeze-up of the tap line is prevented, whereby the use of a Pitot tube as the circulating device is especially energy efficient since it does not require any additional energy other than the pressure head or flow of the water in the main line. This arrangement also greatly facilitates the construction of the tap lines without any parallel tap lines. Further, auxiliary tanks at the tap lines are avoided.

According to the invention, it is assured that at least a portion of the liquid flow or stream in the main line is diverted into the tap line through the hose in the tap line so that the water flows out of the hose and keeps circulating through the hose and the tap line back into the main line. Such a continuous flow prevents freeze-up in the tap line.

According to the invention the recirculating flow in the tap line is sustained by the flow in the main line or, if necessary a small pump may be provided in the tap line in those instances where the pressure head in the main line is insufficient to sustain the recirculating flow. This may be the case for example, if a plurality of tap lines are to be protected against freeze-up or where the tap line has a substantial length. The recirculation pump could be driven by a small electric motor. Fractional horsepower motors are sufficient for this purpose.

The pump could even be driven by a turbine wheel positioned in the main line and driven by the water flowing through the main line.

Where the recirculation is to be sustained in a few or short tap lines, an L-shaped intake for the Pitot tube has been found to be effective as a simple and cost efficient solution to the problem of tap line freeze-up. The Pitot tube can be permanently installed into the tap line with the intake of the Pitot tube facing against the flow direction of the water in the main line. Such permanent installation results in a cost efficient manufacture of the tap lines.

BRIEF DESCRIPTION OF THE DRAWINGS

In order that the invention may be clearly understood, it will now be described, by way of example, with reference to the accompanying drawings, wherein:

FIG. 2 shows one embodiment of the invention in which the water circulation device in a tap line is a hose and Pitot tube reaching with its intake into the main line;

FIG. 3 illustrates an embodiment with a Pitot tube and a branching hose for sustaining recirculation in a branching tap line;

DETAILED DESCRIPTION OF PREFERRED EXAMPLE EMBODIMENTS AND OF THE BEST MODE OF THE INVENTION

Figure 1:
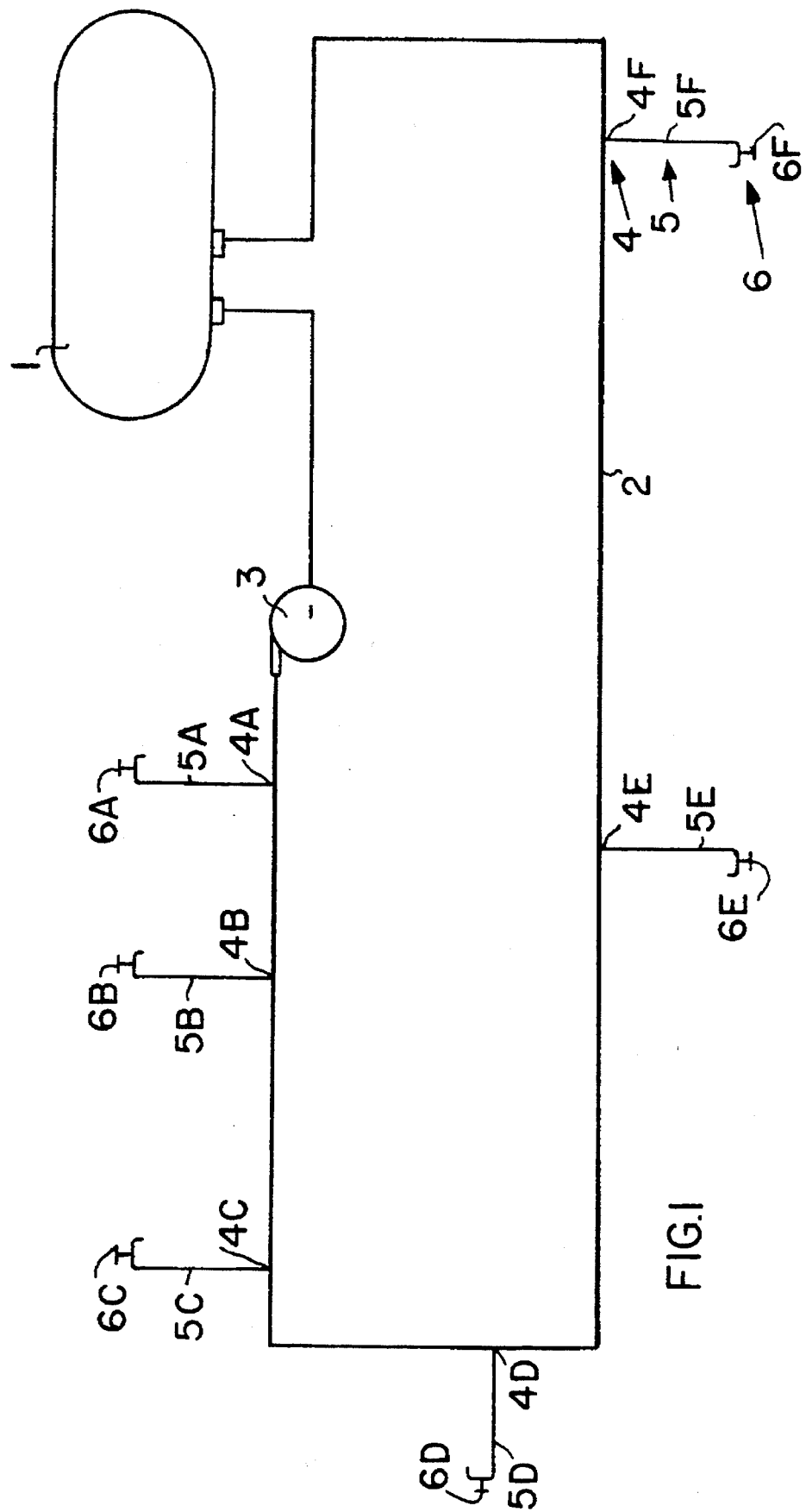
FIG. 1 is a schematic diagram of a water supply system according to the invention having a recirculating main line and six tap lines coupled to the main line and equipped according to the invention.

FIG. 1 shows schematically a water supply system for an aircraft. The system has a water tank 1 connected through a return flow main line 2 comprising a circulating pump 3, to a plurality of tap lines or tap pipes 5, 5A, 5B, 5C, 5D, 5E and 5F. Each tap line or pipe has a first end or remote end away from the main line 2. The remote end is connected to a normally closed liquid discharge device, such as a faucet 6, 6A, 6B, 6C, 6D, 6E, 6F, a valve, or the like. Each tap line further has a second end near the main line 2. The second ends are coupled to the main line by conventional couplings 4, 4A, 4B, 4C, 4D and 4F. These couplings 4 may, for example, include a coupling nut for pressing a coupling member such as a flange of the main line to the tap pipe by cooperating with a threaded coupling flange. These flanges are connected to the tap pipe and to the main line and one is threaded for cooperation with the coupling nut. These couplings 4, 4A, . . . are of conventional construction and hence not described nor shown in further detail.

The faucets or valves 6, 6A to 6F are, for example, located in an on-board kitchen or in an on-board toilet. FIG. 2 shows, for example, a push button valve 7 connected to the remote end of the tap pipe 5. In all embodiments the pump 3 assures the circulation of the water in the main line 2. Preferably, the circulating main line 2 is installed horizontally in or near the deck in the aircraft body and the tap or branch pipes 5, 5A to 5F are installed approximately vertically to lead to the various water distribution positions at 6A to 6F in the cabin of the aircraft.

FIG. 2 shows an embodiment of a tap line or pipe 5 equipped according to the invention with a liquid or water circulator 8 mounted directly in the tap line or pipe 5 by a mounting 11 such as a rib or spoke that secures the circulator 8 to the internal wall of the pipe 5 forming a rim so that the circulator 8 is held centrally in the pipe 5. The lower or second end of the pipe 5 is coupled to the main line 2 by the coupling 4. The circulator 8 has a water intake 9 reaching into the main line 2. The intake 9 is preferably part of an L-section 9A forming the lower end of the circulator 8 in the form of a Pitot tube. The intake 9 faces against the flow direction FD inside the main line 2 to utilize the water flow or the dynamic head thereof for establishing a circulation C through the circulator 8 and the branch or tap pipe 5 even if the valve 7 is closed. The circulator in the form of a Pitot tube 8 reaches axially into the pipe 5 and a circulator outlet 10 faces toward the valve 7 or toward the faucet 6. A liquid conduit 12 such as a pipe or hose of smaller diameter than the pipe 5 extends axially inside the pipe 5 and is connected to the outlet 10 of the Pitot tube 8. The length of the conduit 12 is so selected that it extends at least through that portion of the pipe 5 that may be exposed to a freeze-up condition.

The conduit 12 is made preferably of a material meeting drinking water regulations. This requirement applies to all components coming into contact with the water. The conduit 12 must be sufficiently stiff or rigid so that it remains preferably centrally inside the pipe 5 for the required length to maintain the circulation C at least in that portion of the pipe 5 that may be exposed to a freeze-up condition. If the tap or branch line 5 has a substantial length, it is recommended to support the conduit 12 inside the pipe 5 by spoke type inserts also made of a material suitable for exposure to drinking water.

In operation, when water is circulating in the main line 2, part of the flow water enters into the Pitot intake 9 of the Pitot tube 8 and passes upwardly in the Pitot tube 8 as a result of the dynamic pressure head which is normally sufficient to establish the circulation C, unless a substantial number of circulators must be operated, or unless the pipe 5 has a substantial length. In those instances the invention discloses a circulation established or maintained by a driven pump to be described below. The water rising in the Pitot tube 8 and in the hose 12 exits at the upper end of the hose or conduit 12 and flows downwardly back into the main line 2 as indicated by the arrows C. Thus, as long as there is a sufficient flow in the main line 2, the circulation C will also be maintained. The circulation C prevents a freeze-up without auxiliary tap lines connected in parallel to the tap lines and without extra heating of the tap lines, thereby making an efficient use of the dynamic pressure head available in the main line 2.

Preferably, the conduit 12 extends in the branch pipe 5 substantially to a point next to the discharge end of the pipe 5 such as the valve 7 or faucet 6, whereby the entire pipe 5 is protected against freeze-up. However, the minimum length for the conduit 12 depends on the length of that portion of the pipe 5 that passes through a low temperature area within the aircraft. The main line 2 is normally installed in the deck of the aircraft where it is exposed to temperatures that could cause freeze-up even in the main line 2. However, the pump 3 maintains a circulation that is usually sufficient to prevent freeze-up in the main line. Portions of the tap pipe 5 extending within the passenger cabin or walls thereof normally do not need to be equipped with the conduit 12 because freeze-up in these portions is not likely, due to the temperatures maintained in the passenger cabin.

Figure 4:
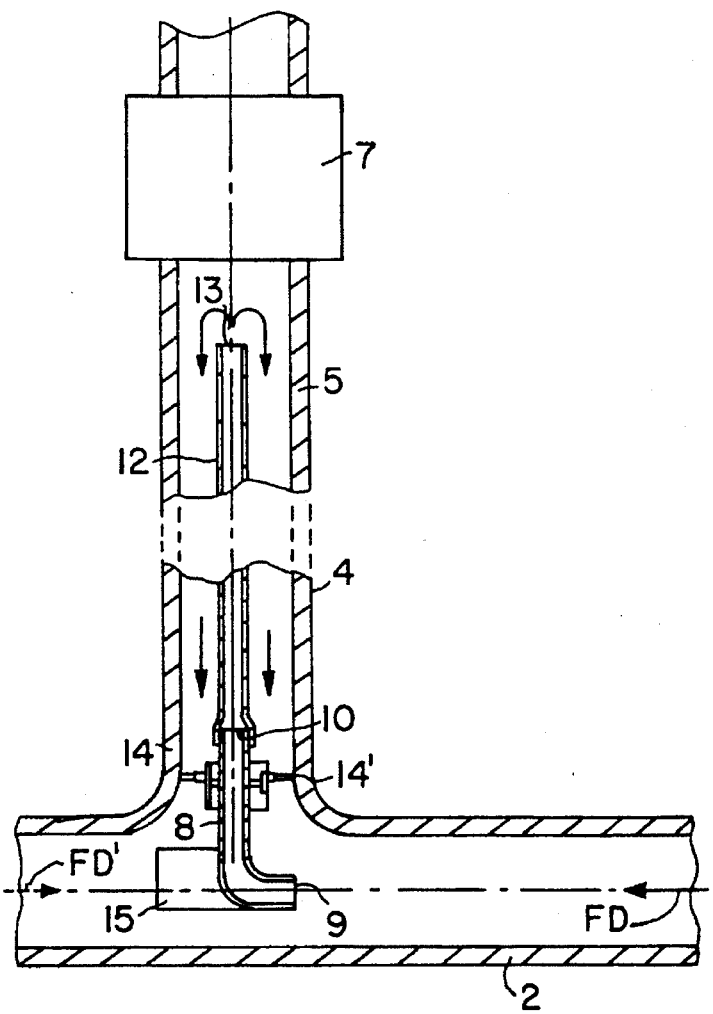
FIG. 4 illustrates an embodiment in which the Pitot tube is capable of orienting its inlet port to face against the flow direction in the main line, whereby the flow direction in the main line can be reversed.
Figure 5:
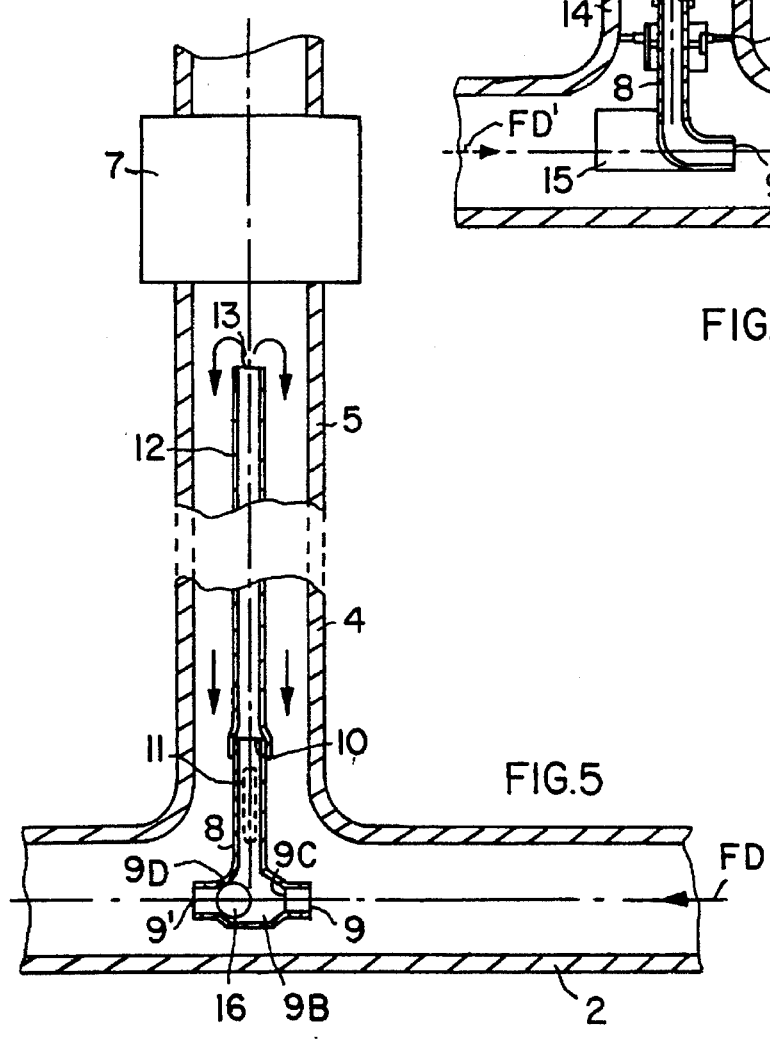
FIG. 5 is an embodiment with a double inlet Pitot tube, whereby the flow direction in the main line can also be reversed.

FIG. 3 shows an embodiment in which the tap pipe 5 has two branching sections 5' and 5" closed by valves 7' and 7", respectively. In order to prevent freeze-up of the water in the branch lines 5', 5", the conduit 12 has a T-configuration with branching conduits 12' and 12" having outlets 13' and 13". The outlets 13', 13" reach substantially close to the valves 7', 7" if necessary. The circulator 8 in FIG. 3 is also constructed as a Pitot tube as shown in FIG. 2. The number of branching tap lines can be more than two. However, if necessary, the Pitot tube circulator can be replaced by a pump circulator to be described below. The construction shown in FIG. 3 prevents freeze-up even in the branches of the tap line. The embodiment shown in FIGS. 1, 2 and 3 rely on a main line 2 that permits a circulating water flow so that the flow is always in the same direction through the main line 2. However, the present invention can also be applied in a system that uses a main line in which the water flow is no longer continuously in one direction and wherein the water flow direction is reversed. Thus, it is necessary to provide a circulator that can adapt itself to different flow directions. FIGS. 4 and 5 illustrate such embodiments.

FIG. 4 shows the Pitot tube 8 mounted in a rotary bearing 14 which in turn is held by spokes 14' inside the lower end of the tap pipe 5. The Pitot tube 8 in FIG. 4 is equipped with a directional vane 15 that can respond to the flow direction FD or to the flow direction FD' to orient the Pitot intake 9 against the respective flow direction. In FIG. 4 it is assumed that the flow is in the direction FD.

FIG. 5 shows an embodiment in which the Pitot tube has two intakes 9 and 9' facing in opposite directions as part of a T-section 9B forming two valve seats 9C and 9D. A valve ball 16 is responsive to the flow direction. As shown, the valve ball 16 closes the valve seat 9D because the flow FD is from right to left in FIG. 5. If the flow direction is reversed, the valve ball 16 will travel from left-to-right to be seated against the valve seat 9C.

Figure 6:
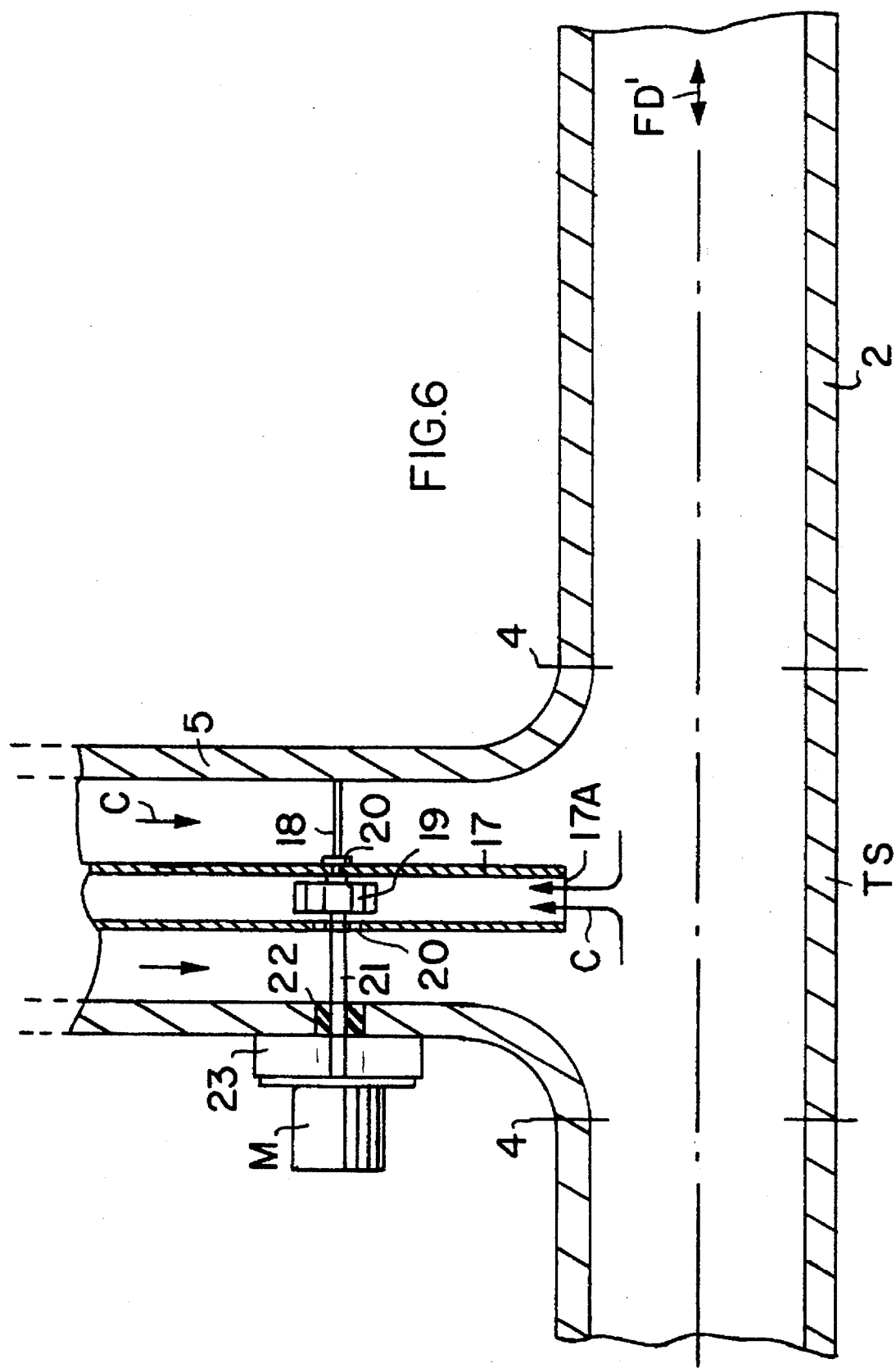
FIG. 6 shows an embodiment in which the water circulating device is a pump driven by a small electric motor.

FIG. 6 illustrates an embodiment in which the circulator is independent of the flow direction FD' in the main pipe 2. A circulator pipe section 17 has an intake 17A positioned to be accessible to the flow in the main line 2. Preferably, the tap pipe 5 ends in a T-section TS that is connected into the main line 2 by conventional couplings 4 such as coupling nuts cooperating with respective threaded flanges, simple flange couplings, and any other couplings suitable for securing pipe sections to each other in a sealed manner. The pipe section 17 is held centrally in place by spokes 18 bearing against the inner surface of the tap pipe 5. A pump wheel 19 is rotatably mounted in the pipe section 17 in bearings 20. The wheel 19 and the pipe section 17 together form preferably a centrifugal or rotary pump in which the pump wheel preferably has straight blades in the manner of a paddle wheel. The wheel 19 is driven by a drive shaft 21 passing through a seal 22 in the wall of the tap pipe 5. The shaft 21 is driven by a motor M secured to the tap pipe 5 by a bearing flange 23. Reversible, small fractional horse power motors are suitable for the motor M. The embodiment of FIG. 6 is not dependent on the position of the couplings 4 as shown. Rather, the coupling could also be provided as shown, for example, in FIG. 2 at the lower end of the pipe 5.

Figure 7:
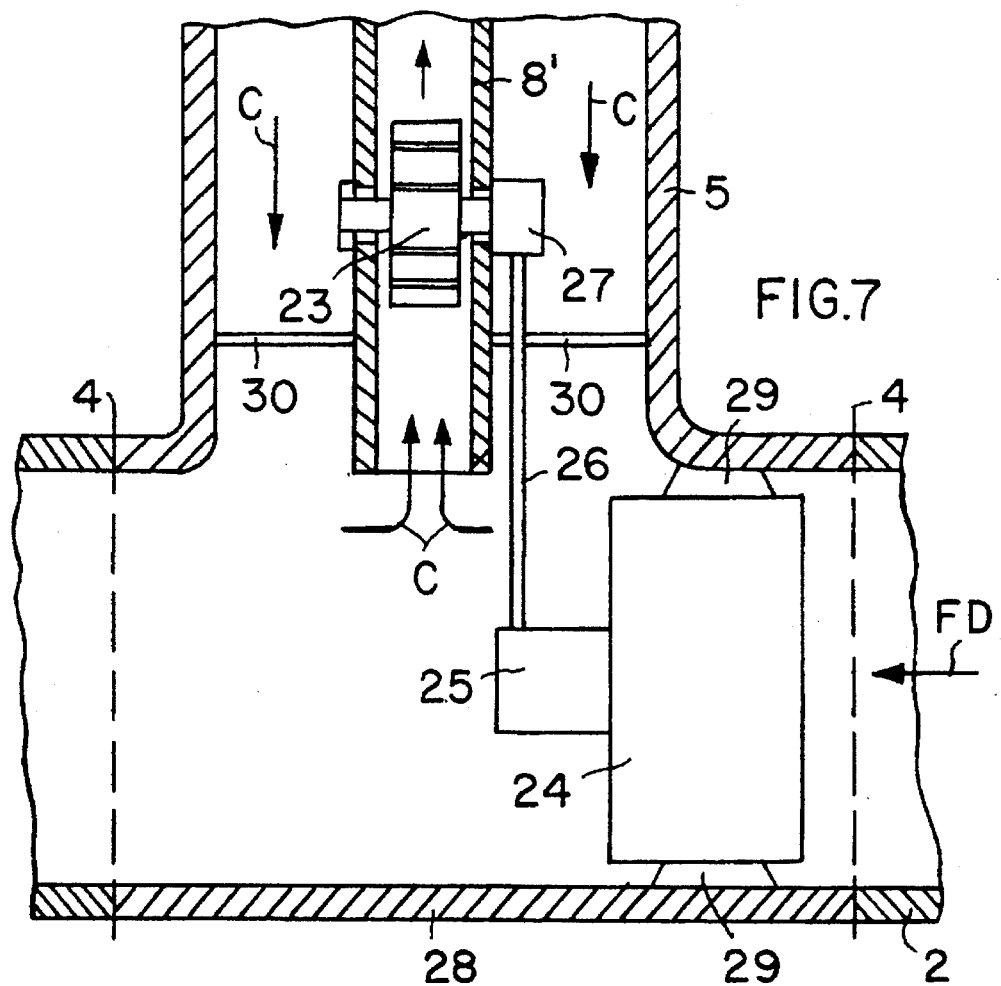
FIG. 7 shows an embodiment in which the water circulating pump is driven by a turbine wheel inserted directly into the flow inside a main liquid supply line.

In FIG. 7, the circulation C in the tap pipe 5 is maintained by a pump 23 driven by a turbine wheel 24 through power transmission elements, including a gear box 25, a transmission shaft 26 and another gear box 27 including bevel gears. The turbine wheel 24 is conventionally mounted in its housing, which in turn is mounted in a T-section 28 by ribs 29. The pipe 8 is also mounted by ribs or spokes 30 in the pipe 5. The pipe 5 with its T-section 28 is preferably a preassembled unit which is then coupled at 4 to the main line 2. The turbine wheel 24 is driven by the water flow in the main line 2.

Figure 8:
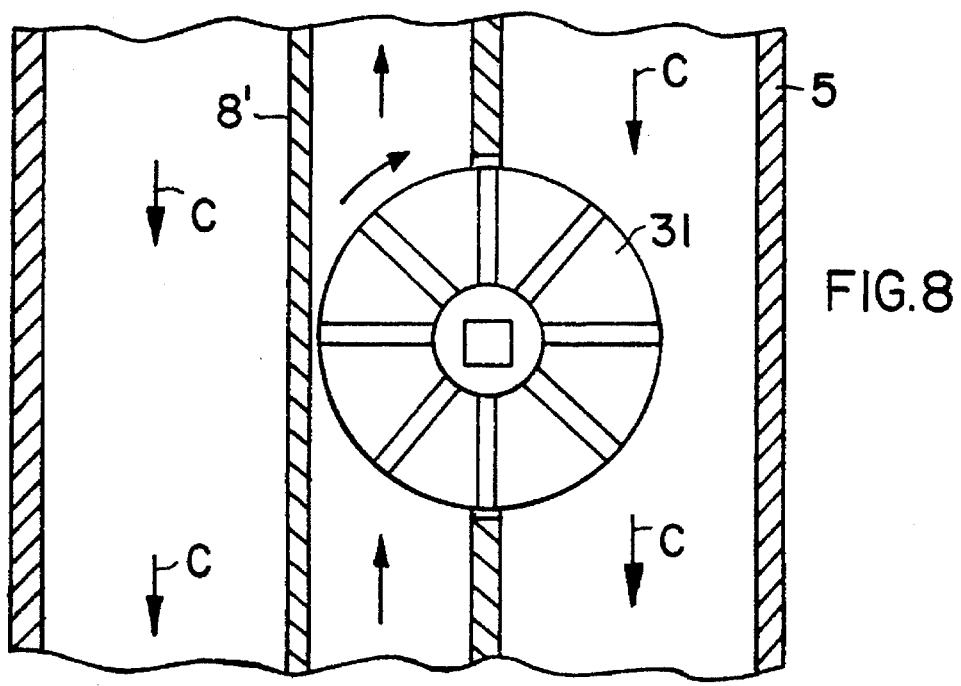
FIG. 8 illustrates a rotary pump with a paddle wheel that can be driven either by an electric motor as in FIG. 6 or by a turbine wheel as in FIG. 7.

FIG. 8 shows a pump wheel 31 so mounted in the pipe 8 that the pump wheel is effective partly in the pipe 8 and partly in the tap pipe 5 to sustain the circulation C. The pump wheel 31 may be driven as shown in FIG. 6 or as shown in FIG. 7. In all instances the pump wheel will be so mounted in the respective circulator pipe section that the wheel can be effective for its intended purpose to form substantially a centrifugal pump.

It is preferred that the recirculating components and the tap pipe are preassembled as a unit that is then only coupled to the main line. In those instances where the circulator is not a Pitot tube, the hose 12 could be positioned to reach to the main line 2. Thus, the pump could be located where it is convenient to flange an electric motor to the pipe 5.

The present circulator with its components and the present water supply system is suitable for many different applications such as in aircraft, ships, trains, buildings, vehicles and any situations where a liquid in a tap or branch pipe could be exposed to freezing temperatures.

Although the invention has been described with reference to specific example embodiments, it will be appreciated that it is intended to cover all modifications and equivalents within the scope of the appended claims.

What is claimed is:

1. An aircraft comprising a water supply system including a main supply line (2) in said water supply system, at least one water tap (7), at least one tap line (5) having one end connected to said main supply line (2) and another end connected to said tap (7), a freeze-up preventing hose (12) in said tap line (5), said hose (5) having a circulator intake (9) toward said main supply line (2) for diverting a proportion of water in said main supply line into said hose, said hose further having a circulator outlet (13) toward said water tap (7), said hose forming a first water conduit (C) inside said hose and a second water conduit (C) inside said tap line around said hose for circulating water flow inside said tap line at least through a length of said tap line that could be exposed to freeze-up, said hose having at least said length.

2. The aircraft of claim 1, further comprising a pipe section (8) connected to said hose inside said tap line, said pipe section forming said circulator intake (9).

3. The aircraft of claim 2, wherein said pipe section is a Pitot tube forming said circulator intake reaching into said main supply line (2), said circulator intake facing against a water flow direction (FD) in said main supply line (2).

4. The aircraft of claim 3, wherein said circulator intake comprises an L-section reaching into said main supply line.

5. The aircraft of claim 3, further comprising a holder (11) holding said Pitot tube in a fixed position at least partly inside said tap line (5).

6. The aircraft of claim 3, wherein said circulator intake comprises a T-section (9B) reaching into said main supply line (2) and forming two oppositely facing intakes.

7. The aircraft of claim 6, wherein said T-section comprises an intake switching member (16) inside said T-section, said switching member (16) being adapted for responding to a water flow direction (FD) in said main supply line (2).

8. The aircraft of claim 7, wherein said T-section comprises two valve seats (9C, 9D), and wherein said intake switching member (16) is a valve ball movable in said T-section for cooperation with one or the other of said valve seats depending on said water flow direction (FD) in said main supply line (2).

9. The aircraft of claim 3, further comprising a rotary bearing (14) rotatably mounting said Pitot tube at least partly in said tap line (5).

10. The aircraft of claim 9, wherein said water circulator comprises a position adjustment member (15) for rotating said Pitot tube so that said circulator intake (9) faces against the direction of water flow (FD) in said main supply line (2).

11. The aircraft of claim 10, wherein said position adjustment member is a vane (15) attached to said Pitot tube for rotating said circulator intake (9) to face against the direction of water flow (FD) in said main supply line (2).

12. The aircraft of claim 1, further comprising a pump (19) inside said hose inside said tap line.

13. The aircraft of claim 12, further comprising an electric motor for driving said pump.

14. The aircraft of claim 12, further comprising a turbine wheel (24) in said main supply line (2), said turbine wheel (24) being connected to said pump for rotating said pump.

15. The aircraft of claim 12, wherein said pump comprises a paddle wheel (23).

* * * * *